US012732758B2

(12) United States Patent
Fukamachi

(10) Patent No.: US 12,732,758 B2
(45) Date of Patent: Sep. 8, 2026

(54) PRESSURE WAVE GENERATING ELEMENT

(71) Applicant: Murata Manufacturing Co., Ltd., Nagaokakyo (JP)

(72) Inventor: Kohei Fukamachi, Nagaokakyo (JP)

(73) Assignee: MURATA MANUFACTURING CO., LTD., Nagaokakyo (JP)

( * ) Notice: Subject to any disclaimer, the term of this patent is extended or adjusted under 35 U.S.C. 154(b) by 147 days.

(21) Appl. No.: 18/663,386

(22) Filed: May 14, 2024

(65) Prior Publication Data

US 2024/0305931 A1 Sep. 12, 2024

Related U.S. Application Data

(63) Continuation of application No. PCT/JP2023/016074, filed on Apr. 24, 2023.

(30) Foreign Application Priority Data

Sep. 12, 2022 (JP) ................................ 2022-144685

(51) Int. Cl.
*H04R 23/00* (2006.01)

(52) U.S. Cl.
CPC .................................. *H04R 23/002* (2013.01)

(58) Field of Classification Search
CPC ...... H04R 2307/02; H04R 23/002; B06B 1/02
See application file for complete search history.

(56) References Cited

U.S. PATENT DOCUMENTS 10,779,089 B1 * 9/2020 Schumacher .......... G10K 15/04
11,561,297 B2 1/2023 Sasaki et al.
2020/0292683 A1 9/2020 Sasaki et al.

FOREIGN PATENT DOCUMENTS

JP H11-300274 A 11/1999
JP 2007-075686 A 3/2007
JP 2013187845 A * 9/2013
WO 2019/159401 A1 8/2019

OTHER PUBLICATIONS

Weihua Gu et.al. "Polyimide-Based Foams: Fabrication and Multifunctional" Applications, Sep. 1, 2020.*
International Search Report received for PCT Patent Application No. PCT/JP2023/016074, mailed on Jul. 25, 2023, 2 pages.

* cited by examiner

*Primary Examiner* — Sunita Joshi
(74) *Attorney, Agent, or Firm* — ArentFox Schiff LLP

(57) ABSTRACT

A pressure wave generating element that includes: a first solid insulating layer having a first principal surface; a first metal layer on the first principal surface of the first solid insulating layer; a second metal layer disposed at a distance from the first metal layer in a thickness direction of the first solid insulating layer such that the first solid insulating layer is located between the first metal layer and the second metal layer; a first electrode electrically connected to a first end side of the first metal layer and a second end side of the second metal layer; and a second electrode electrically connected to a third end side of the first metal layer and a fourth end side of the second metal layer.

15 Claims, 9 Drawing Sheets

PRESSURE WAVE GENERATING ELEMENT

CROSS REFERENCE TO RELATED APPLICATIONS

The present application is a continuation of International application No. PCT/JP2023/016074, filed Apr. 24, 2023, which claims priority to Japanese Patent Application No. 2022-144685, filed Sep. 12, 2022, the entire contents of each of which are incorporated herein by reference.

TECHNICAL FIELD

The present description relates to a thermal excitation type pressure wave generating element.

BACKGROUND ART

A thermal excitation type pressure wave generating element (also referred to as "thermophone") that generates a pressure wave by heating a medium such as air has been proposed (for example, Patent Document 1).

The thermal excitation type pressure wave generating element includes a resistor (typically, a metal layer) that generates heat when energized. When a current flows through the resistor, the resistor generates heat, and air in contact with the resistor thermally expands. Subsequently, when the energization is stopped, the expanded air contracts. Such expansion and contraction of air generates a pressure wave (also referred to as sound wave). Unlike a sound source using a piezoelectric body, the thermal excitation type pressure wave generating element does not use a resonance mechanism. Therefore, it is possible to generate a sound wave having a wide band and a short pulse.

Patent Document 1: Japanese Patent Application Laid-Open No. H11-300274

SUMMARY OF THE DESCRIPTION

However, the thermal excitation type pressure wave generating element generates a sound wave after converting electric energy into thermal energy, thereby having a low energy conversion efficiency. Therefore, it is sometimes difficult to increase the output sound pressure.

An object of the present description is to solve the above problem, and to provide a thermal excitation type pressure wave generating element capable of generating a higher sound pressure.

To solve the problem, the pressure wave generating element according to the present description is a thermal excitation type pressure wave generating element including: a first solid insulating layer having a first principal surface; a first metal layer on the first principal surface of the first solid insulating layer; a second metal layer disposed at a distance from the first metal layer in a thickness direction of the first solid insulating layer such that the first solid insulating layer is located between the first metal layer and the second metal layer; a first electrode electrically connected to a first end side of the first metal layer and a second end side of the second metal layer; and a second electrode electrically connected to a third end side of the first metal layer and a fourth end side of the second metal layer.

According to the present description, a thermal excitation type pressure wave generating element capable of generating a higher sound pressure is provided.

DESCRIPTION OF THE PREFERRED EMBODIMENTS

Figure 1:
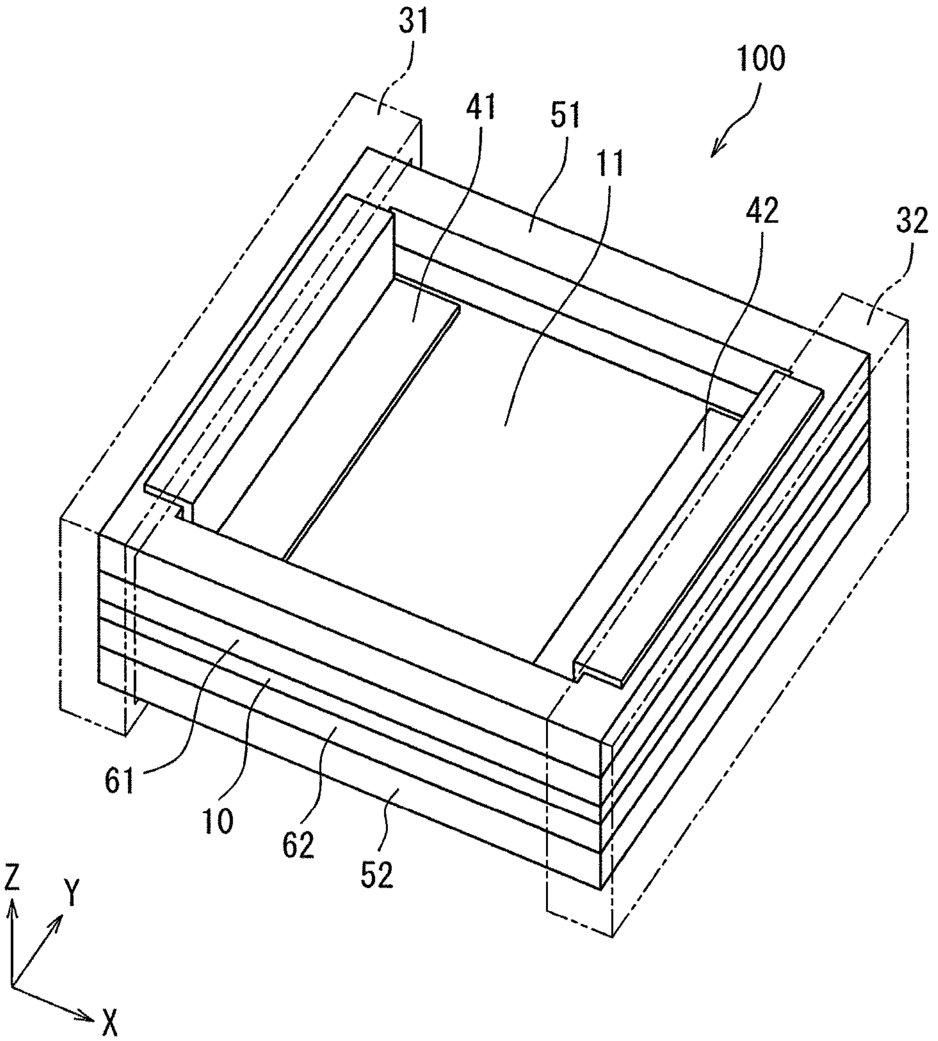
FIG. 1 is a schematic perspective view of a pressure wave generating element according to an embodiment of the present description.

Hereinafter, embodiments of the present description will be described with reference to the drawings. This embodiment does not limit the present description. In the drawings, substantially the same members are denoted by the same reference numerals, and the description thereof will be omitted. Further, for the purpose of illustration, the dimension of each member in a drawing may be exaggerated and is not necessarily to scale.

In the following, for convenience of description, terms indicating directions such as "upper", "lower", "right", "left", and "side" are used, but these terms do not limit the manufacturing state, the use state, and the like of the pressure wave generating element according to the present description.

Embodiment

The pressure wave generating element according to an embodiment of the present description includes a plurality of resistors (metal layers) that generate heat when energized. The plurality of metal layers is stacked at a distance from each other and connected in parallel between a pair of electrodes. In the present specification, such a pressure wave generating element is referred to as "laminated pressure wave generating element" or a "laminated element".

Figure 2:
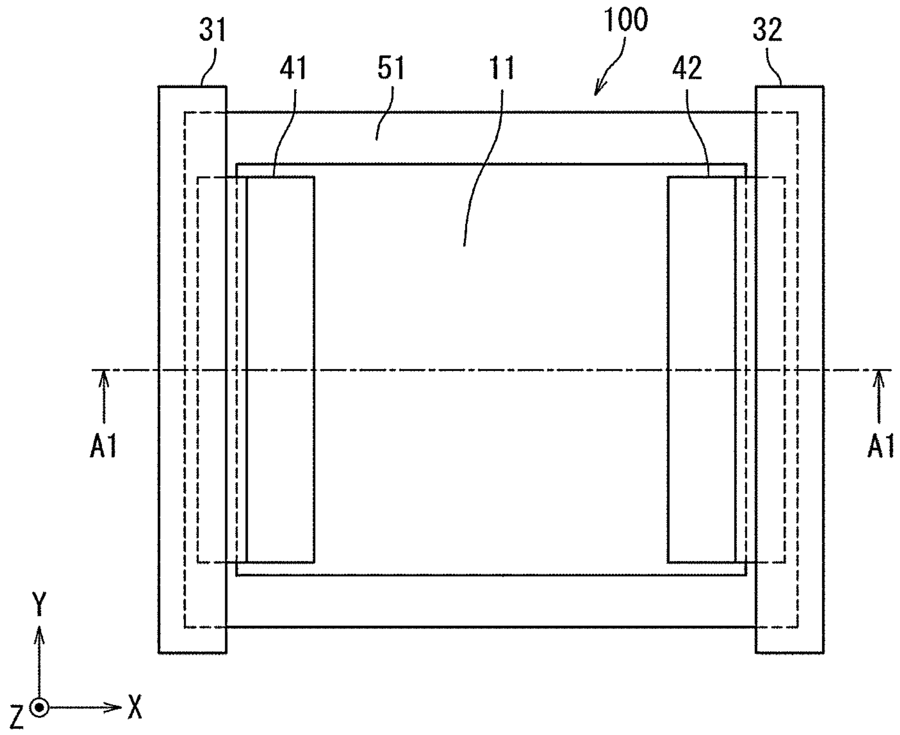
FIG. 2 is a schematic top view of the pressure wave generating element in FIG. 1.
Figure 3:
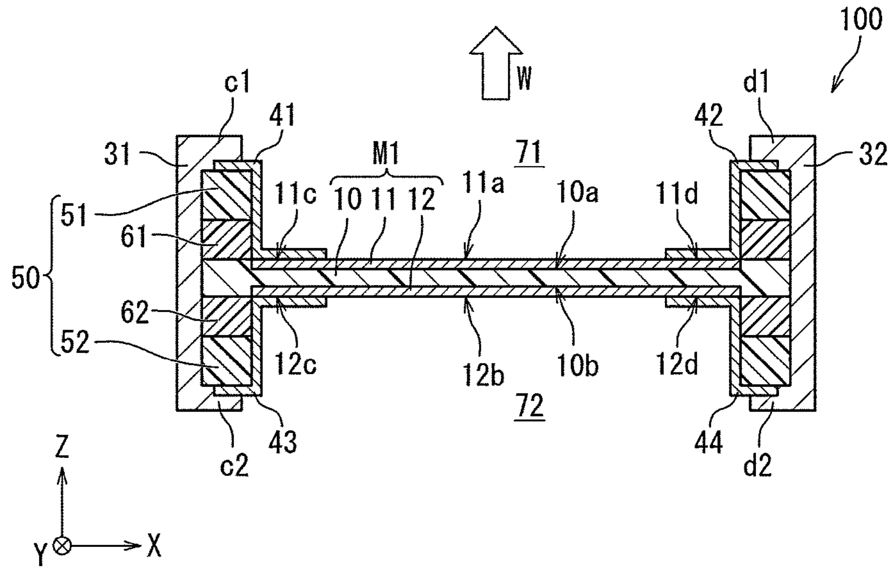
FIG. 3 is a schematic sectional view of the pressure wave generating element in FIG. 1 taken along the line A1-A1.

The pressure wave generating element according to an embodiment of the present description will be described with reference to FIGS. 1 to 3. FIG. 1 is a schematic perspective view of a pressure wave generating element according to an embodiment of the present description. FIG. 2 is a schematic top view of the pressure wave generating element in FIG. 1. FIG. 3 is a schematic sectional view taken along the line A1-A1 illustrated in FIG. 2.

As illustrated in FIGS. 1 to 3, a pressure wave generating element 100 according to the embodiment includes metal layers 11 and 12, a solid insulating layer 10, and a pair of electrodes 31 and 32.

In FIGS. 1 to 3, the thickness direction of the solid insulating layer 10 is defined as the Z direction. In FIGS. 1 and 3, the dimension of each member in the Z direction is exaggerated for easy understanding. In the top view illustrated in FIG. 2, the horizontal direction is defined as the X direction, and the direction orthogonal to the X direction (vertical direction) is defined as the Y direction. In the illustrated example, the outer edge of the pressure wave generating element 100 is substantially rectangular in plan view in the Z direction, and the directions in which the sides extend are the X direction and the Y direction, respectively. The planar shape of the pressure wave generating element 100 is not limited to the illustrated shape.

The metal layers 11 and 12 are disposed at a distance from each other in the thickness direction (Z direction) of the solid insulating layer 10. That is, the metal layers 11 and 12 are stacked in the Z direction. The metal layers 11 and 12 are connected in parallel between the electrode 31 and the electrode 32.

The solid insulating layer 10 is located between the metal layer 11 and the metal layer 12 in the Z direction. The solid insulating layer 10 may have a plurality of through-holes penetrating in the thickness direction. For example, the solid insulating layer 10 may be a layer having a porous structure (for example, a fiber layer).

The solid insulating layer 10 has a principal surface (also referred to as "first principal surface") 10*a* and a principal surface (also referred to as "second principal surface") 10*b* opposed to the principal surface 10*a*. In this example, the metal layer 11 is provided on the principal surface 10*a* of the solid insulating layer 10, and the metal layer 12 is provided on the principal surface 10*b* of the solid insulating layer 10. The metal layers 11 and 12 may be in contact with the solid insulating layer 10.

At least a part of the surface of each of the metal layers 11 and 12 on the side opposite to the solid insulating layer 10 is in contact with a medium such as air. In the illustrated example, the upper surface 11*a* of the metal layer 11 is in contact with an air layer 71. The lower surface 12*b* of the metal layer 12 is in contact with an air layer 72.

In the specification, a structure M1 including the solid insulating layer 10 and the metal layers 11 and 12 provided on both surfaces of the solid insulating layer 10 may be referred to as "first heating element". In addition, the metal layer 11 in the first heating element M1 may be referred to as "first metal layer", and the metal layer 12 may be referred to as "second metal layer".

The electrodes 31 and 32 are a pair of electrodes that apply a voltage to each of the metal layers 11 and 12 in a predetermined direction (here, the X direction). In plan view, the electrode 31 is electrically connected to one end side (the left end side in this example, e.g., a first end side) of the metal layer 11 and one end side (the left end side in this example, e.g., a second end side) of the metal layer 12. The electrode 32 is electrically connected to the other end side (the right end side in this example, e.g., a third end side) of the metal layer 11 and the other end side (the right end side in this example, e.g., a fourth end side) of the metal layer 12. Each of the metal layers 11 and 12 extends continuously from one end side electrically connected to the electrode 31 to the other end side electrically connected to the electrode 32. In plan view of the metal layers 11 and 12, the width in the energization direction (X direction) and the width in the direction orthogonal to the energization direction (Y direction) are not particularly limited. In this example, the width in the X direction and the width in the Y direction are substantially the same.

The pressure wave generating element 100 may further include a pair of connection electrodes 41 and 42 to electrically connect the metal layer 11 to the electrodes 31 and 32, and a pair of connection electrodes 43 and 44 to electrically connect the metal layer 12 to the electrodes 31 and 32.

In the illustrated example, the electrode 31 has, on one end side (here, the left side) of the first heating element M1, a first portion c1 located above the first heating element M1, a second portion c2 located below the first heating element M1, and a connection portion extending in the Z direction so as to connect the first portion c1 and the second portion c2. Similarly, the electrode 32 has, on the other end side (here, the right side) of the first heating element M1, a first portion d1 located above the first heating element M1, a second portion d2 located below the first heating element M1, and a connection portion extending in the Z direction so as to connect the first portion d1 and the second portion d2. The connection electrode 41 electrically connects the left end 11*c* of the upper surface 11*a* of the metal layer 11 and the first portion c1 of the electrode 31. The connection electrode 42 electrically connects the right end 11*d* of the upper surface 11*a* of the metal layer 11 and the first portion d1 of the electrode 32. Similarly, the connection electrode 43 electrically connects the left end 12*c* of the lower surface 12*b* of the metal layer 12 to the second portion c2 of the electrode 31, and the connection electrode 44 electrically connects the right end 12*d* of the lower surface 12*b* to the second portion d2 of the electrode 32.

The pressure wave generating element 100 may further include a support structure 50 that supports the first heating element M1. The support structure 50 may be an annular structure that supports the outer periphery of the metal layer 11 (in this example, the outer periphery of the metal layers 11 and 12) and the solid insulating layer 10.

The support structure 50 includes, for example, a support (sometimes referred to as "first support") 51 provided on the principal surface 10*a* side of the solid insulating layer 10 and a support (sometimes referred to as "second support") 52 provided on the principal surface 10*b* side of the solid insulating layer 10. The supports 51 and 52 may be disposed so as to hold the peripheral edge of the solid insulating layer 10 therebetween. The peripheral edge of the solid insulating layer 10 and the support 51 may be bonded through an adhesive layer 61, and the peripheral edge of the solid insulating layer 10 and the support 52 may be bonded through an adhesive layer 62.

In the illustrated example, in plan view, the support 51 is disposed so as to surround the metal layer 11, and the support 52 is disposed so as to surround the metal layer 12. In plan view, the metal layers 11 and 12 may be formed over substantially the entire region exposed from the support in the principal surfaces 10*a* and 10*b* of the solid insulating layer 10. Each of the connection electrodes 41 and 42 may extend from a part of the upper surface 11*a* of the metal layer 11 so as to cover a part of the support 51. Similarly, each of the connection electrodes 43 and 44 may extend from a part of the lower surface 12*b* of the metal layer 12 so as to cover a part of the support 52.

In the pressure wave generating element 100, a drive signal is provided to each of the metal layers 11 and 12 via the pair of electrodes 31 and 32. The metal layer 11 gives the air layer 71 a thermal shock through a temperature change corresponding to the waveform of the drive signal to generate a first pressure wave. Similarly, the metal layer 12 generates a second pressure wave in the air layer 72 through a temperature change corresponding to the waveform of the drive signal. A synthesized wave (sound wave) W of the first pressure wave and the second pressure wave can be emitted to the outside of the pressure wave generating element 100, for example, in the Z direction (in the illustrated example, from above the metal layer 11).

The frequency of the synthesized wave W emitted from the pressure wave generating element 100 can be adjusted by the drive signal. For example, when the drive signal is set to an audible frequency, the pressure wave generating element 100 can be used as an acoustic speaker, and when the drive signal is set to an ultrasonic frequency, the pressure wave generating element 100 can be used as an ultrasonic source.

The pressure wave generating element 100 may further include a substrate (not illustrated). The substrate can be disposed at a distance from the first heating element M1 in the Z direction. For example, when the synthesized wave W is emitted from above the metal layer 11, the substrate may be disposed below the metal layer 12 at a distance from the lower surface 12*b* of the metal layer 12.

According to the pressure wave generating element 100 of the embodiment, a plurality of metal layers 11 and 12 are arranged at a distance in the thickness direction of the solid insulating layer 10 (Z direction), and are connected in parallel between the electrodes 31 and 32. The metal layers 11 and 12 are connected in parallel. As a result, the element resistance can be reduced as compared with a single-layer pressure wave generating element (single-layer element) including a single metal layer. A small element resistance can increase the input power to the pressure wave generating element 100. Thereby, the pressure wave generating element 100 achieves an improved output sound pressure (the sound pressure of the synthesized wave W). In addition, since the metal layers 11 and 12 connected in parallel are stacked in the Z direction, it is possible to increase the sound pressure while suppressing an increase in the element size in plan view.

According to the embodiment, the solid insulating layer 10 is located between the metal layer 11 and the metal layer 12. That is, the metal layers 11 and 12 are disposed with the solid insulating layer 10 interposed therebetween. As a result, it is possible to efficiently emit the synthesized wave W of pressure waves generated when the metal layers 11 and 12 heat the air in the thickness direction (Z direction) of the solid insulating layer 10. Specifically, as illustrated in FIG. 3, when the synthesized wave W is emitted from above the metal layer 11, the second pressure wave generated when the metal layer 12 heats the air layer 72 is emitted after passing through the solid insulating layer 10. However, the first pressure wave generated when the metal layer 11 heats the air layer 71 can be emitted without passing through the solid insulating layer 10. On the other hand, when the synthesized wave is emitted from below the metal layer 12, the first pressure wave is emitted after passing through the solid insulating layer 10. However, the second pressure wave is emitted without passing through the solid insulating layer 10. As described above, a pressure wave generated when one of the metal layers generates heat can be emitted without passing through the solid insulating layer 10.

Further, according to the embodiment, the metal layers 11 and 12 are provided on both the surfaces of the solid insulating layer 10. Thereby heat transfer from the metal layers 11 and 12 to the solid insulating layer 10 is suppressed by the heat insulating effect of the solid insulating layer 10. Therefore, the heat from the metal layers 11 and 12 can be more efficiently transferred to the air layers 71 and 72. Therefore, the metal layers 11 and 12 are energized to cause a larger temperature change in the air layers 71 and 72. Accordingly, the sound pressure per unit input power can be increased.

In addition, by providing the metal layers 11 and 12 on both surfaces of the solid insulating layer 10, one solid insulating layer 10 can function as a heat insulating layer for the two metal layers 11 and 12. Therefore, as compared with a case where separate heat insulating layers are provided for the metal layers 11 and 12, the number of components can be reduced, and the pressure wave generating element 100 can be further downsized.

In the embodiment, the solid insulating layer 10 may have a plurality of through-holes. For example, the solid insulating layer 10 may have a porous structure. Each through-hole in the solid insulating layer 10 only needs to penetrate the solid insulating layer 10 in the thickness direction, and is optionally parallel to the Z direction. The plurality of through-holes may be regularly arranged or may be randomly arranged in the solid insulating layer 10 in plan view. With the solid insulating layer 10 having a through-hole, the second pressure wave generated on the principal surface 10*b* side of the solid insulating layer 10 by energizing the metal layer 12 can be efficiently emitted to the principal surface 10*a* side of the solid insulating layer 10 through the through-hole. Alternatively, the first pressure wave generated in the air layer 71 on the principal surface 10*a* side of the solid insulating layer 10 by energizing the metal layer 11 can be efficiently emitted to the principal surface 10*b* side of the solid insulating layer 10 through the through-hole. Therefore, the synthesized wave W of the first pressure wave and the second pressure wave can be more efficiently emitted in the Z direction of the pressure wave generating element 100.

The solid insulating layer 10 having a porous structure may be, for example, an insulating layer containing a fiber. With the solid insulating layer 10 containing a fiber, the first pressure wave or the second pressure wave can more efficiently pass through the solid insulating layer 10 by utilizing voids around the fiber. Alternatively, the solid insulating layer 10 may be a porous layer containing no fiber. In this case, the first pressure wave or the second pressure wave can more efficiently pass through the solid insulating layer 10 by utilizing a plurality of pores in the porous layer.

In the embodiment, an annular support structure 50 that supports the outer periphery the metal layer 11 (in this example, the outer periphery of the metal layers 11 and 12) may be provided. As a result, the pressure wave generated by energizing the metal layer 11 is more easily emitted in the Z direction than from the side of the pressure wave generating element 100. The support structure 50 may be disposed so as to shield the emission of the pressure wave from the side of the pressure wave generating element 100.

(First Heating Element M1)

The first heating element M1 may be formed of a porous membrane (for example, a fiber membrane) having a porous structure. Hereinafter, an example of the first heating element M1 in the embodiment will be described.

Figure 4:
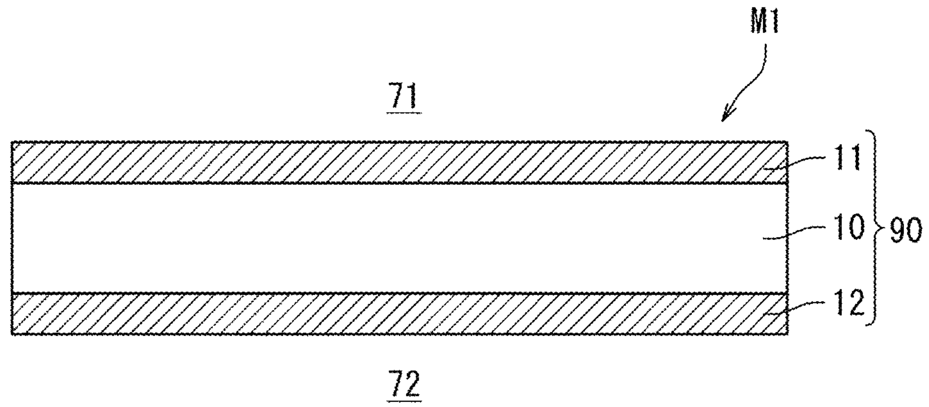
FIG. 4 is a schematic sectional view illustrating an example of a first heating element.
Figure 4:
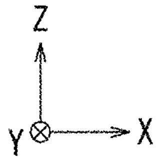

FIG. 4 is a schematic enlarged sectional view illustrating an example of the first heating element M1 in the embodiment. In the example shown in FIG. 4, the first heating element M1 has a fiber membrane 90. The metal layers 11 and 12 are fiber-containing metal layers formed by coating the front surface and the back surface of the fiber membrane 90 with metal. The solid insulating layer 10 is an insulating layer located between the metal layers 11 and 12 in the fiber membrane 90 and including a portion not coated with metal (referred to as "non-coated portion").

According to the first heating element M1 having the structure illustrated in FIG. 4, the metal layers 11 and 12 are connected in parallel to successfully reduce the element resistance and further increase the sound pressure per unit input power. The reason why the sound pressure per unit input power can be increased includes, for example, the following (1) to (3).

(1) As the first heating element M1, a fiber membrane coated with metal is used. Accordingly, the first heating element M1 has a smaller heat capacity per volume.

(2) The metal layers 11 and 12, being formed by coating a fiber membrane with metal, may have surface irregularities and/or may include voids (through-holes) therein due to the fiber structure. Therefore, the contact area between the metal and the air can be increased. As the solid insulating layer 10, the non-coated portion is provided in the fiber membrane between the metal layers 11 and 12. As a result, the heat insulating effect of the solid insulating layer 10 can be enhanced. Therefore, the air layers 71 and 72 can be more efficiently heated by energizing the metal layers 11 and 12.

(3) The pressure wave generated by energizing the metal layer 11 or the metal layer 12 is easily emitted to the opposite side of the fiber membrane 90 through voids in the fiber membrane 90 having a porous structure. Since it is possible to suppress a decrease in sound pressure due to the pressure wave passing through the solid insulating layer 10, the synthesized wave W can be efficiently emitted.

The fiber membrane 90 including the solid insulating layer 10 and the metal layers 11 and 12 may have a plurality of through-holes that allows the air layers 71 and 72 located on the front surface and the back surface of the fiber membrane 90 to communicate with each other. This makes it easier for the pressure wave to pass through the fiber membrane 90.

The porosity of the solid insulating layer 10 as the non-coated portion in the fiber membrane 90 is, for example, about the same as the porosity of the fiber membrane before coated with metal. The porosity of the solid insulating layer 10 may be 80% to 95%. When the porosity is 80% or more, the pressure wave can more efficiently pass through the solid insulating layer 10. In addition, the heat capacity per volume of the first heating element M1 can be further reduced. Furthermore, when the metal layers 11 and 12 are formed on a fiber membrane having a high porosity (80% or more), the contact area between the metal layers 11 and 12 and air can be further increased. On the other hand, when the porosity of the solid insulating layer 10 is 95% or less, the metal layers 11 and 12 can be more reliably supported on the surface of the solid insulating layer 10. The porosity of the solid insulating layer 10 can be appropriately adjusted by the fiber structure, the material, the fiber diameter, and the like.

The solid insulating layer 10 as the non-coated portion may have a thickness of, for example, 1 μm or more. From the viewpoint of securing the heat insulating effect, the thickness of the solid insulating layer 10 is preferably 10 μm or more. When the metal layers 11 and 12 are formed by coating a fiber membrane having a porosity of 80% to 95% with metal, the thickness of each of the metal layers 11 and 12 may be, for example, 1 μm or more.

Figure 5:
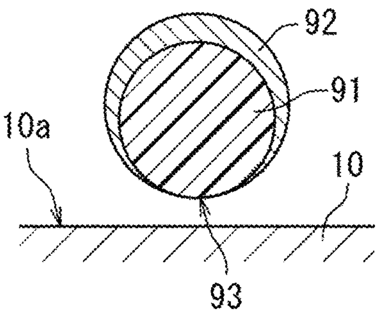
FIG. 5 is a schematic enlarged sectional view illustrating one fiber coated with metal.

When the fiber membrane 90 is coated with metal, the metal covering the surface of each fiber constituting the fiber membrane 90 may be uniform or non-uniform in thickness in the circumferential direction of the fiber. FIG. 5 is a schematic enlarged sectional view illustrating one fiber 91 located in the metal layers 11 and 12, and coated with metal. As exemplified in FIG. 5, the thickness of metal 92 covering each fiber 91 may increase as the distance from the principal surface 10*a* of the solid insulating layer 10 increases. On the peripheral surface of the fiber 91, the thickness of the metal 92 at the part closest to the solid insulating layer 10 may be smaller than the thickness of the metal 92 at the part farthest from the solid insulating layer 10. There may be a portion 93 that is not covered with metal on the solid insulating layer 10 side of the peripheral surface of the fiber 91. This makes it possible to enhance heat generation in the metal layers (fiber-containing metal layers) 11 and 12 while suppressing heat generation inside the solid insulating layer 10.

The coating state (sectional image) of the metal-coated fiber can be analyzed, for example, by processing a sample with a focused ion beam (FIB), observing the section with a transmission electron microscope (JEM-F200; manufactured by JEOL Ltd.), and performing element mapping analysis by energy dispersive X-ray spectroscopy.

(Method for Manufacturing Pressure Wave Generating Element 100)

An example of the method for manufacturing the pressure wave generating element 100 will be described.

First, a porous membrane to be the metal layers 11 and 12 and the solid insulating layer 10 is prepared. Here, a fiber membrane is prepared as the porous membrane. The fiber membrane may have a form in which fibers randomly oriented in plan view are bonded or entangled by a thermal, mechanical, or chemical action to form a sheet (the form of nonwoven fabric). Alternatively, the fiber membrane may be in the form of a woven fabric in which warps and wefts are combined, or in the form of a knitted fabric in which fibers are knitted. Alternatively, the fiber membrane may be in the form of a mixture of two or more of a nonwoven fabric, a woven fabric, and a knitted fabric. In the fiber membrane, voids around fibers communicate with each other to form a plurality of minute through-holes, and air permeability is secured.

The fiber can be selected from the group consisting of polymer fibers, glass fibers, carbon fibers, carbon nanotubes, metal fibers, and ceramic fibers. As the fiber, for example, a low thermal conductive material such as a polymer, glass, or ceramic may be used.

Specific examples of the polymer material include polyimide (PI), polyamide, polyamide imide, polyethylene, polypropylene, acrylic resin, polyvinyl chloride, polystyrene, polyvinyl acetate, polytetrafluoroethylene, liquid crystal polymer, polyphenylene sulfide, polyether ether ketone, polyarylate, polysulfone, polyether sulfone, polyether imide, polycarbonate, modified polyphenylene ether, polybutylene terephthalate, polyethylene terephthalate (PET), polyacetal, polylactic acid, polyvinyl alcohol, ABS resin, polyvinylidene fluoride, cellulose, polyethylene oxide, polyethylene glycol, and polyurethane. From the viewpoint of heat resistance, for example, polyimide can be used as the material of the fiber membrane.

As the porous membrane, a porous membrane not containing fibers, such as a porous polytetrafluoroethylene membrane or a porous polyimide membrane, may be used instead of the fiber membrane.

Next, the support 51 is adhered onto a part of the front surface of the fiber membrane, for example, via the adhesive layer 61. Next, the support 52 is adhered onto a part of the back surface of the fiber membrane, for example, via an adhesive layer 62. As the supports 51 and 52, for example, a ceramic substrate such as glass, silicon, alumina, zirconia, magnesium oxide, aluminum nitride, boron nitride, or silicon nitride, or a flexible substrate such as a PI film or a PET film can be used. As the material of the adhesive layers 61 and 62, a thermosetting resin or the like can be used.

Subsequently, the metal layer 11 is formed by coating the region exposed from the support 51 in the front surface of the fiber membrane with metal. Similarly, the metal layer 12 is formed in the region exposed from the support 52 in the back surface of the fiber membrane. As the coating method, a method such as a vapor deposition method, an ion plating method, an atomic layer deposition method, or an electroless plating method can be adopted. Examples of the material of the metal layers 11 and 12 include metal materials such as Au, Ag, Cu, Pt, Rh, Pd, Ru, Ni, Ir, Cr, Mo, W, Ti, and Al, or alloys containing two or more kinds of these metals. The metal layer may have a single layer structure or may have a laminated structure made of a plurality of materials.

Next, the connection electrodes 41 to 44 are formed. As the method for forming the connection electrodes 41 to 44, vapor deposition, a sputtering method, an ion plating method, an atomic layer deposition method, an electroless plating method, a spraying method, printing, a dipping method, or the like can be adopted. Examples of the connection electrode material include metals such as Au, Ag, Cu, Pt, Rh, Pd, Ru, Ni, Ir, Cr, Mo, W, Ti, and Al, or alloys containing two or more kinds of these metals.

Thereafter, the electrodes 31 and 32 are formed to obtain the pressure wave generating element 100. As the method for forming the electrode, vapor deposition, a sputtering method, an ion plating method, an atomic layer deposition method, electrolytic plating, electroless plating, spray coating, dip coating, printing, and the like can be adopted. Examples of the material of the electrodes 31 and 32 include metals such as Au, Ag, Cu, Pt, Rh, Pd, Ru, Ni, Ir, Cr, Mo, W, Ti, and Al. Each of the electrodes 31 and 32 may have a single layer structure or a multilayer structure made of a plurality of materials.

The structure of the pressure wave generating element 100, the material of each component, the manufacturing method, and the like are not limited to the above-described examples. The solid insulating layer 10 may be solid (i.e., non-porous). The solid insulating layer 10 may be a polymer film containing the polymer material described above. In this case, a through-hole may be formed to allow a sound wave to pass through in the polymer film, for example, by patterning.

The metal layers 11 and 12 do not have to be a layer formed by metal coating. For example, a metal foil containing the above-described metal material or alloy material may be used as the metal layers 11 and 12. The metal foil may be bonded to the front surface and the back surface of the solid insulating layer 10 by a known method.

Figure 6:
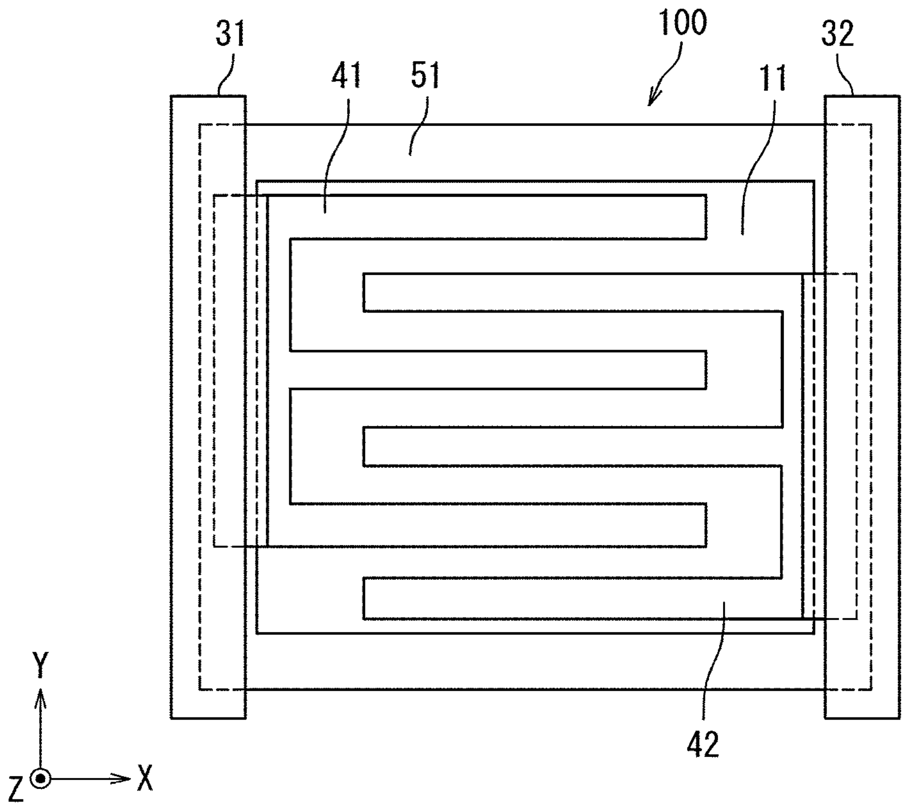
FIG. 6 is a schematic top view illustrating another example of the pressure wave generating element.

Furthermore, the structures of the connection electrodes 41 to 44 and the electrodes 31 and 32 are also not limited to the illustrated examples. For example, as illustrated in FIG. 6, a pair of connection electrodes (for example, the connection electrodes 41 and 42) may have a comb-like structure arranged to face each other in plan view in the Z direction.

Furthermore, components such as a connection electrode, a support structure, and an adhesive layer can be appropriately omitted depending on the structure, process, and the like of the pressure wave generating element.

<Modification 1>

Figure 7:
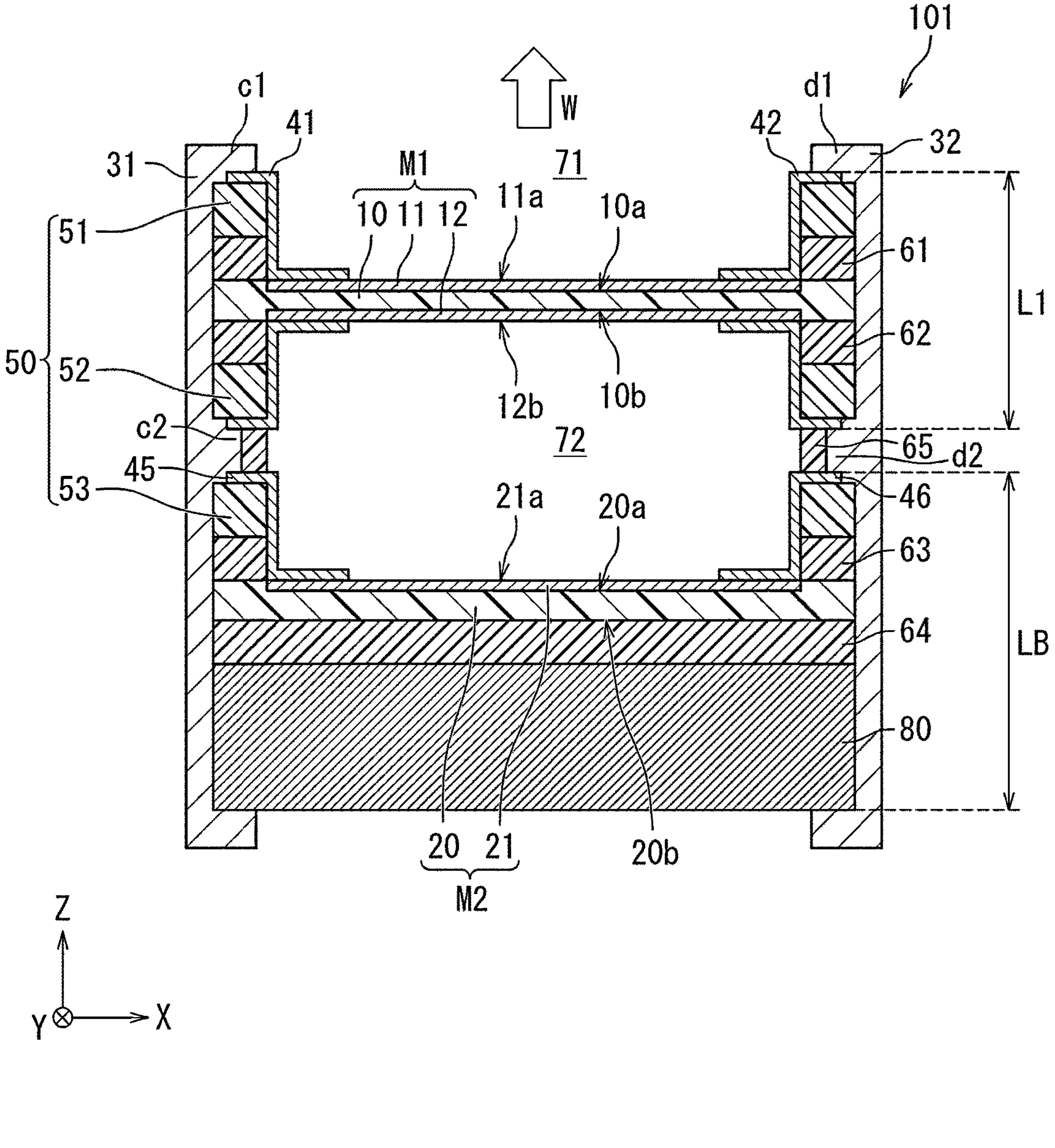
FIG. 7 is a schematic sectional view illustrating a pressure wave generating element according to Modification 1.

FIG. 7 is a schematic sectional view illustrating a pressure wave generating element 101 according to Modification 1. The pressure wave generating element 101 is different from the pressure wave generating element 100 illustrated in FIGS. 1 to 3 in that the pressure wave generating element 101 further includes another metal layer 21 disposed at a distance from the metal layers 11 and 12 in the Z direction.

The metal layer 21 is disposed on a side of the metal layer 12 opposite to the solid insulating layer 10 with a distance from the metal layer 12 in the Z direction. The metal layer 12 and the metal layer 21 are opposed each other with the air layer 72 interposed therebetween. The upper surface 21*a* of the metal layer 21 may be in contact with the air layer 72. The metal layers 11, 12, and 21 are connected in parallel between the pair of electrodes 31 and 32. One end side of the metal layers 11, 12, and 21 is electrically connected to the electrode 31, and the other end side is electrically connected to the electrode 32. The metal layer 21 and the electrodes 31 and 32 may be electrically connected via the connection electrodes 45 and 46.

The pressure wave generating element 101 may further include a solid insulating layer (sometimes referred to as "second solid insulating layer") 20. In the illustrated example, the metal layer 21 is provided on the principal surface (sometimes referred to as "third principal surface") 20*a* of the solid insulating layer 20 on the metal layer 12 side. The metal layer 21 may be a fiber-containing metal layer formed on the front surface of the fiber membrane by metal coating, and the solid insulating layer 20 may be an insulating layer including the non-coated portion of the fiber membrane.

In the example illustrated in FIG. 7, the metal layer 21 is disposed between the solid insulating layer 10 and the solid insulating layer 20 at a distance from the solid insulating layer 10. With such an arrangement, when the synthesized wave W is emitted from above the metal layer 11, the pressure wave generated in the air layer 72 by energizing the metal layer 21 (third pressure wave) is emitted after passing through only the solid insulating layer 10, without passing through the solid insulating layer 20. Therefore, the synthesized wave W can be more efficiently emitted.

In the specification, a structure M2 in which a resistor (metal layer) that generates a pressure wave by energization is provided only on one principal surface of the solid insulating layer, such as the structure including the metal layer 21 and the solid insulating layer 20, is referred to as "second heating element". In the second heating element M2, the principal surface of the solid insulating layer opposite to the metal layer may be in contact with a heat dissipation layer such as a substrate or in contact with air.

A substrate 80 may be provided on the principal surface 20*b* of the solid insulating layer 20 opposite to the metal layer 21. The solid insulating layer 20 and the substrate 80 may be bonded to each other with an adhesive layer 64 interposed therebetween. The substrate 80 can function as, for example, a heat dissipation layer. Examples of the substrate 80 include a glass substrate, a ceramic substrate such as silicon, alumina, zirconia, magnesium oxide, aluminum nitride, boron nitride, and silicon nitride, and a flexible substrate such as a PI or PET film.

The support structure 50 may further include a support 53 disposed on the peripheral edge of the principal surface 20*a* of the solid insulating layer 20. The solid insulating layer 20 and the support 53 may be bonded to each other with an adhesive layer 63. The support 53 and the substrate 80 may be configured to hold the peripheral edge of the solid insulating layer 20 therebetween.

In the pressure wave generating element 101, the support structure 50 is, for example, an annular structure that supports the outer periphery of the metal layers 11, 12, and 21 and the solid insulating layers 10 and 20. The support structure 50 and the substrate 80 may be disposed so as to shield the emission of the sound wave from the side and the lower side of the pressure wave generating element 101. As a result, the synthesized wave W of the pressure waves generated by driving the metal layers 11, 12, and 21 can be mainly emitted from above the pressure wave generating element 101 (above the metal layer 11).

The pressure wave generating element 101 can be manufactured by: producing each of a laminate L1 including the first heating element M1, the supports 51 and 52, and the connection electrodes 41 to 44, and a lower laminate LB including the second heating element M2, the support 53, the connection electrodes 45 and 46, and the substrate 80; and stacking the lower laminate LB and the laminate L1 in the Z direction via, for example, an adhesive layer 65. The material, structure, and forming method of the metal layer 21, the connection electrodes 45 and 46, and the solid insulating layer 20 may be the same as those of the metal layers 11 and 12, the connection electrodes 45 and 46, and the solid insulating layer 10, respectively.

Figure 8:
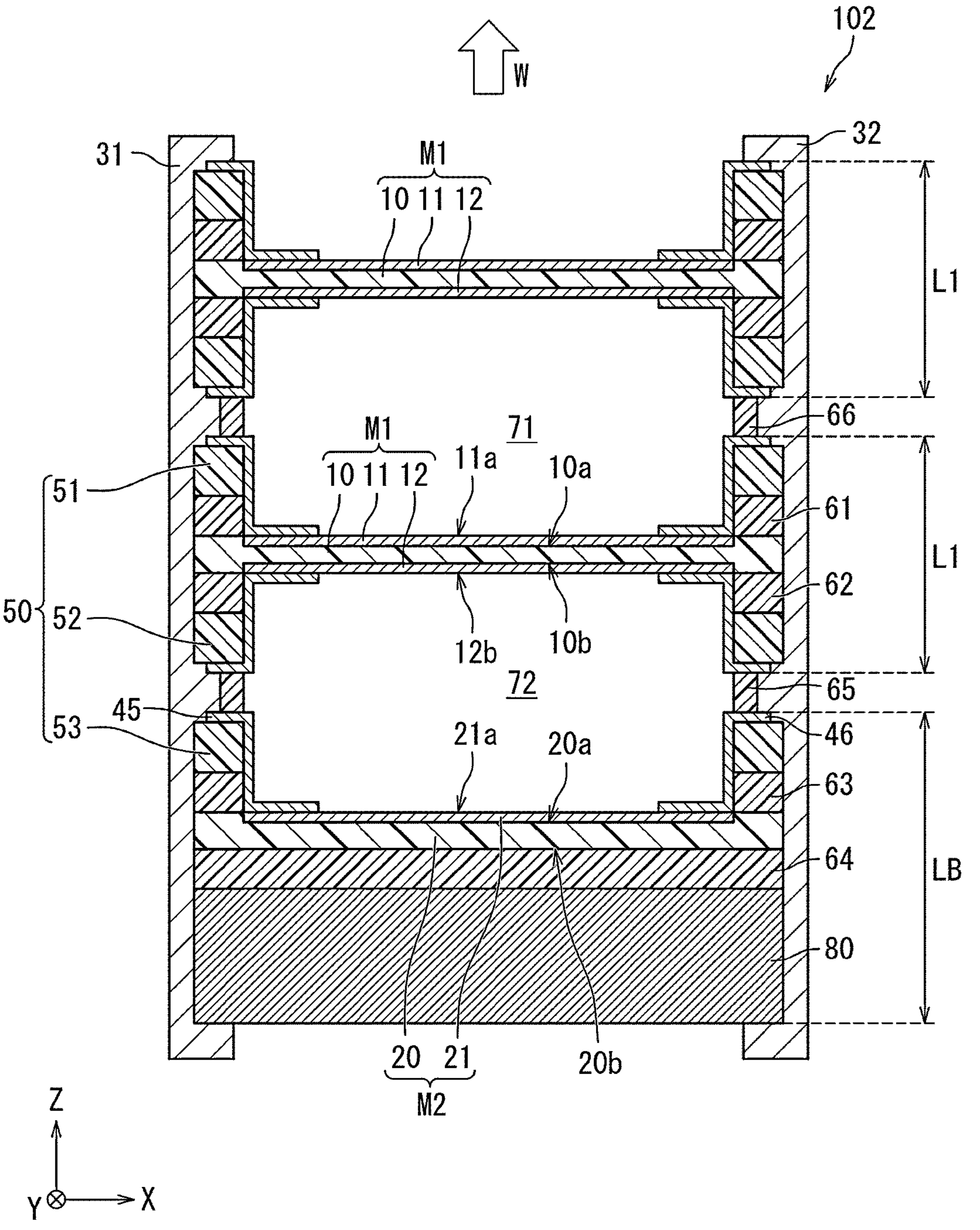
FIG. 8 is a schematic sectional view illustrating another pressure wave generating element according to Modification 1.

FIG. 8 is a schematic sectional view illustrating another pressure wave generating element 102 according to Modification 1. The pressure wave generating element 102 includes a plurality of (here, two) first heating elements M1 stacked above the metal layer 21 with a distance from each other. One end side of the metal layers 11 and 12 of each first heating element M1 is electrically connected to the electrode 31, and the other end side of the metal layers 11 and 12 of each first heating element M1 is electrically connected to the electrode 32. In the specification, when a plurality of heating elements (here, the first heating elements M1) each including a solid insulating layer and a metal layer are stacked, each heating element may be referred to as "unit heating element".

In the illustrated example, a plurality of (here, two) the laminates L1 is stacked in the Z direction above the lower laminate LB with an adhesive layer 66 interposed therebetween. The pressure wave generating element of the modification does not have to include the lower laminate LB. The pressure wave generating element may have, for example, a structure in which a plurality of first heating elements M1 are stacked above a substrate (substrate on which no metal layer is provided).

According to the modification, since more metal layers can be further provided, the element resistance can be further reduced. Therefore, the input power can be further increased, and the sound pressure can be further increased.

<Modification 2>

The pressure wave generating element of Modification 2 has a structure in which two or more second heating elements M2 are stacked at a distance.

Figure 9:
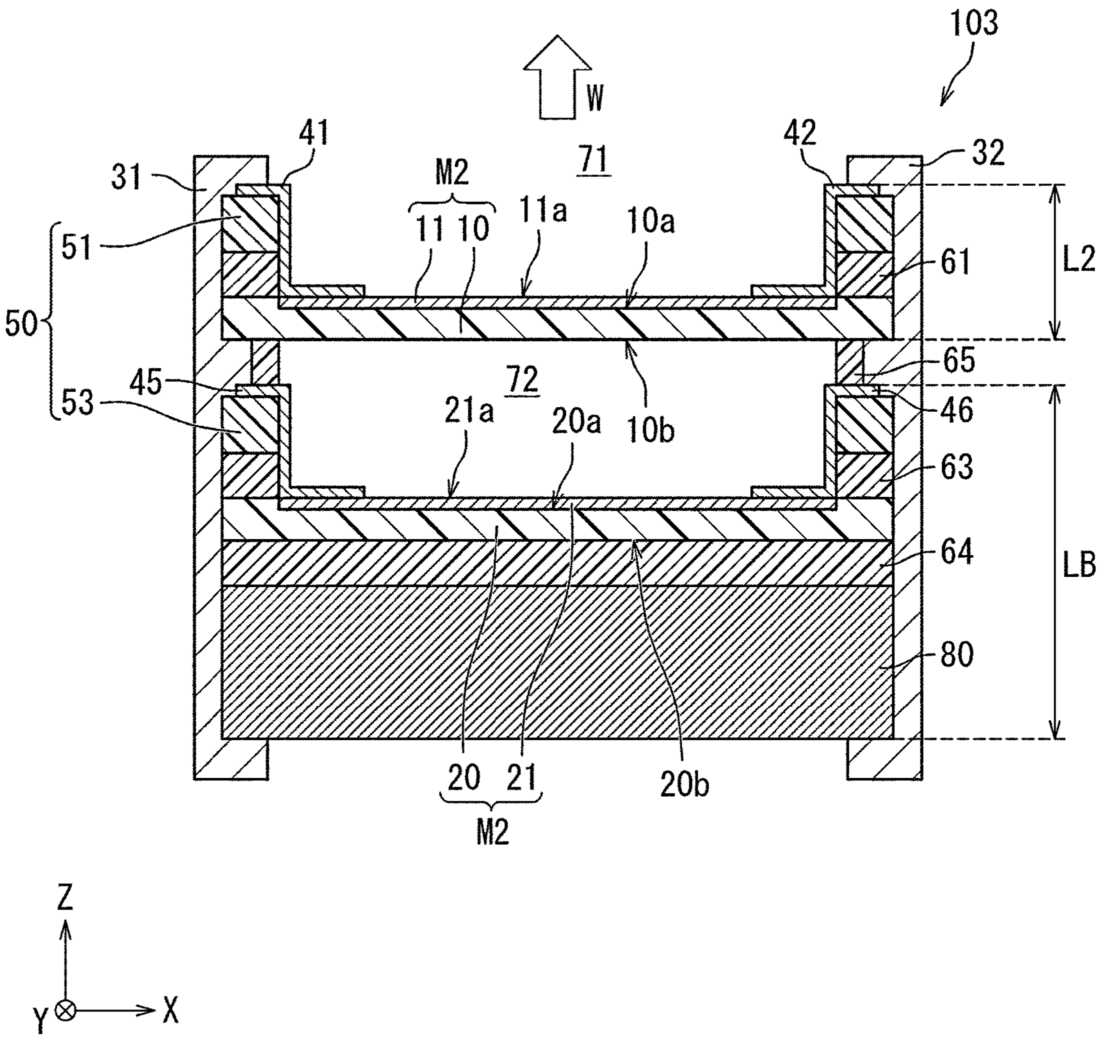
FIG. 9 is a schematic sectional view illustrating a pressure wave generating element according to Modification 2.

FIG. 9 is a schematic sectional view illustrating a pressure wave generating element 103 according to Modification 2. The pressure wave generating element 103 is different from the pressure wave generating element 101 shown in FIG. 7 in that the metal layer 12 and the support 52 are not provided on the principal surface 10*b* of the solid insulating layer 10.

In the pressure wave generating element 103, the metal layer 11 is provided only on the principal surface 10*a* of the solid insulating layer 10. The solid insulating layer 10 and the metal layer 11 constitute the second heating element M2. The principal surface 10*b* of the solid insulating layer 10 opposite to the metal layer 11 is in contact with, for example, the air layer 72.

The second heating element M2 including the solid insulating layer 20 and the metal layer 21 is located below the solid insulating layer 10. The upper surface 21*a* of the metal layer 21 may be in contact with the air layer 72. The metal layer 21 is disposed between the solid insulating layer 10 and the solid insulating layer 20 at a distance from the solid insulating layer 10. As a result, when the synthesized wave W is emitted from above the element, the pressure wave (third pressure wave) generated by energizing the metal layer 21 is emitted after passing through only the solid insulating layer 10, without passing through the solid insulating layer 20. Therefore, the third pressure wave can be efficiently emitted from above the metal layer 11.

The pressure wave generating element 103 can be manufactured, for example, by stacking a laminate L2 including the second heating element M2, the support 51, and the connection electrodes 41 and 42 and the lower laminate LB in the Z direction via an adhesive layer 65.

Figure 10:
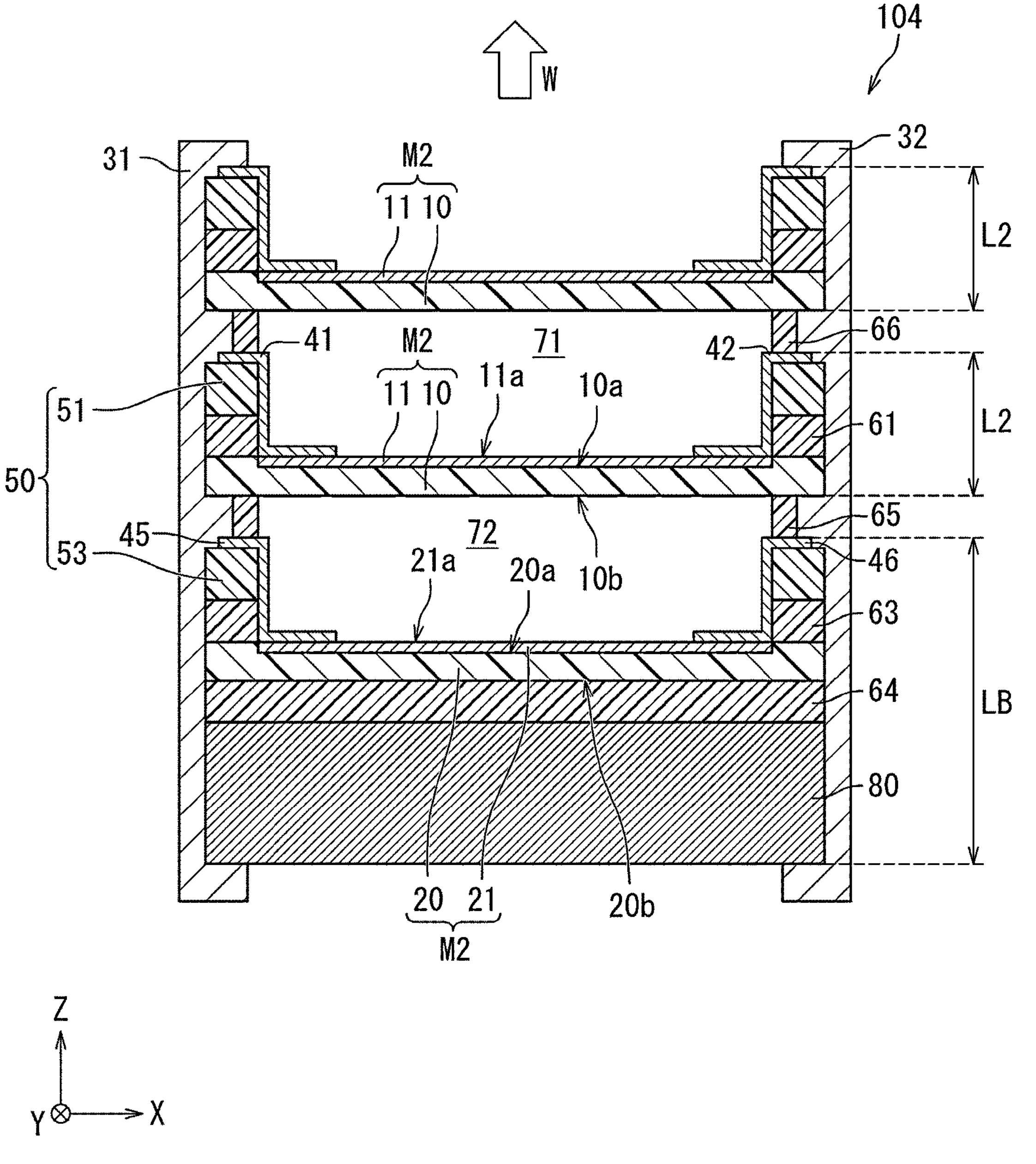
FIG. 10 is a schematic sectional view illustrating another pressure wave generating element according to Modification 2.

FIG. 10 is a schematic sectional view illustrating another pressure wave generating element 104 according to Modification 2. The pressure wave generating element 104 includes a plurality of (here, two) second heating elements (unit heating elements) M2 stacked above the metal layer 21 with a distance from each other. One end side of the metal layer 11 of each second heating element M2 is electrically connected to the electrode 31, and the other end side of the metal layer 11 of each second heating element M2 is electrically connected to the electrode 32. In the illustrated example, a plurality of (here, two) the laminates L2 is stacked in the Z direction above the lower laminate LB with an adhesive layer 66 interposed therebetween.

According to the modification, since more metal layers can be further provided, the element resistance can be further reduced. Therefore, the input power can be further increased, and the sound pressure can be further increased.

Further, according to the modification, in each of the stacked second heating elements M2, the metal layer is located on the side of the solid insulating layer from which the synthesized wave W is emitted (here, on the upper side of the solid insulating layer). In this manner, when the second heating elements M2 are stacked such that the metal layer is positioned on the emission side (here, the upper side) as compared to the solid insulating layer, the pressure wave generated in the air layer in the vicinity of the front surface of the metal layer of each second heating element M2 can be more efficiently emitted in the Z direction (here, the upper side of the element).

EXAMPLES AND COMPARATIVE EXAMPLES

Example 1

In Example 1, a laminated pressure wave generating element including a fiber membrane (first heating element M1) having both surfaces coated with metal was prepared as samples 1 to 3 (see FIGS. 1 to 3). In addition, as a comparative sample, a single-layer pressure wave generating element having a single metal layer was prepared.

Samples 1 to 3

The method for manufacturing the samples 1 to 3 will be described with reference to FIGS. 1 to 3. In the following description, the "size" of each member refers to a size in plan view in the Z direction.

First, a polyimide (PI) fiber membrane was prepared by an electrospinning method as follows.

A PI solution prepared using N, N-dimethylformamide (DMF) as a solvent was used as a spinning solution. The solutions were prepared so as to have a solution concentration of 5.5 wt % and 12 wt %, and lithium chloride was added to the solutions at 0.2 wt % and 0.1 wt %, respectively.

In addition, tetrabutylammonium chloride, potassium trifluoromethanesulfonate, or the like can be used as an additive. Then, PI fibers were simultaneously spun onto an aluminum (Al) foil by an electrospinning method with a multi-nozzle using the 5.5 wt % PI solution and the 12 wt % PI solution. Discharge amount of the 5.5 wt % PI solution and the 12 wt % PI solution was set to 1:1. The discharge amount can be adjusted by the discharge speed, the number of nozzles, and the like. As a collector on which the fiber membrane was deposited, a 200 mmφ drum collector was used, and spinning was performed while rotating at 100 rpm. In the electrospinning, the applied voltage was set to 30 kV, the distance between the nozzle and the collector was set to 13 cm, and the film formation time was adjusted so that the thickness of the fiber membrane was about 2 to 60 μm. The average fiber diameter of the fiber prepared with the 5.5 wt % PI solution was 41 nm, and the average fiber diameter of the fiber prepared with the 12 wt % PI solution was 176 nm. As a result, a fiber membrane in which the fiber having an average fiber diameter of 41 nm and the fiber having an average fiber diameter of 176 nm were complexed was obtained. The porosity of the fiber membrane was 90.1%.

Subsequently, supports 51 and 52 were bonded to the obtained fiber membrane. First, the front surface of the fiber membrane is bonded to a PI film (support 51) having an opening having a size of 4 mm×4 mm. Here, a PI film having an adhesive layer 61 formed on one surface in advance was used, and the fiber membrane and the PI film were thermo-compression-bonded via the adhesive layer 61 to bond the fiber membrane to the PI film. Then, the Al foil was peeled off from the fiber membrane to transfer the fiber membrane to the support 51. Thereafter, the back surface (the surface opposite to the PI film, that is, the surface from which the Al foil was peeled off) of the fiber membrane was bonded to a PI film (support 52) having an opening (size: 4 mm×4 mm) having a size of 4 mm×4 mm in the same manner as described above.

Subsequently, as the metal layer 11, an Au film (size: 4 mm×4 mm) with a thickness distribution in a range of 1 to 40 nm was formed by a sputtering method in the region exposed by the opening of the support 51 in the front surface of the fiber membrane. Similarly, as the metal layer 12, an Au film (size: 4 mm×4 mm) with a thickness distribution in a range of 1 to 40 nm was formed by a sputtering method in the region exposed by the opening of the support 52 in the back surface of the fiber membrane. The non-coated portion in the fiber membrane located between the metal layers 11 and 12 was defined as "solid insulating layer 10" (see FIG. 4). The thickness of the metal coating the surface of each fiber may have, for example, a distribution as described above with reference to FIG. 5.

Subsequently, a pair of connection electrodes 41 and 42 was formed at both ends of the metal layer 11 and both ends of the support 51 by, for example, a sputtering method. Similarly, a pair of connection electrodes 43 and 44 was formed at both ends of the metal layer 12 and both ends of the support 52. Here, as the connection electrodes 41 to 44, an electrode having a laminated structure including Ti (thickness: 10 nm), Cu (thickness: 500 nm), and Au (thickness: 100 nm) from the solid insulating layer side was formed. In plan view, the size of each of the connection electrodes 41 to 44 was 1.4 mm×4 mm, and the distance between the pair of connection electrodes (distance between electrodes) was 3.2 mm. In this way, a laminate including the solid insulating layer 10, the metal layers 11 and 12, the supports 51 and 52, and the connection electrodes 41 to 44 was obtained.

The obtained laminate was divided into pieces having a size of 6 mm×6 mm, and then electrodes 31 and 32 were formed. Here, an Ag electrode paste was applied so as to be bonded to each of the connection electrodes 41 to 44. Thereafter, the Ag electrode paste was dried and cured by heat treatment to form electrodes 31 and 32. In addition to Ag, other metal materials such as Cu may be used as the electrode material. Through such a process, a pressure wave generating element for each of samples 1 to 3 was obtained.

Comparative Sample 1

A single-layer element using a PI film as a solid insulating layer was prepared. Here, as a metal layer, an Au film (thickness: 20 nm, size: 4 mm×4 mm) was formed by a sputtering method on only one surface of the PI film (thickness: 25 μm, size: 6 mm×6 mm). Thereafter, a pair of electrodes was formed on the Au film to obtain a pressure wave generating element for comparative sample 1. The structure and forming method of the electrode were the same as those in samples 1 to 3.

Comparative Sample 2

A single-layer element including a fiber membrane having only one surface coated with metal was prepared. Here, a pressure wave generating element for comparative sample 2 was produced using the same material and the same method as in samples 1 to 3 except that a support and an Au film (metal layer) were formed on only one surface of the fiber membrane. The portion of the fiber membrane where no Au film was formed (non-coated portion) was defined as a solid insulating layer.

Evaluation Method

The method for evaluating the fiber membrane and the element characteristics performed in the example will be described.

1) Average Fiber Diameter

The fiber diameter of the fiber membrane (PI fiber) was measured as follows. The fiber membrane was observed with a scanning electron microscope (S-4800; manufactured by HITACHI, acceleration voltage 5 kV, 3 k to 120 k times) to obtain an SEM image. The average fiber diameter was calculated by measuring the fiber diameter from the obtained image. Specifically, 10 fibers were randomly extracted per visual field from the obtained image, the extraction was performed for 5 visual fields to measure a total of 50 fiber diameters, and an average fiber diameter was calculated.

2) Porosity of Fiber Membrane

The porosity of the fiber membrane (here, polyimide fiber membrane) was calculated by the following formula.

$$\text{Porosity }(\%)=\{1-(\text{bulk density}=\text{true density})\}\times 100$$

As another method of calculating the porosity, the porosity can be calculated by a method of repeating sectional processing with FIB and SEM observation to acquire a three-dimensional stereoscopic image. Specifically, FIB processing is performed with HELIOS NANORAB 660i, which is manufactured by FEI, and a SEM image is observed. Subsequently, processing is performed again with 10 nm in the depth direction with FIB, then a SEM image is observed. By repeating the FIB processing and the SEM observation in this way, SEM images with a depth of 400 nm (41 sheets in total) are obtained. It is possible to construct a 3D stereoscopic image of the fiber membrane from these 41 SEM images and to calculate the porosity.

3) Thickness of Fiber Membrane and Solid Insulating Layer

The section of each sample was observed with a scanning electron microscope (S-4800; manufactured by HITACHI, acceleration voltage of 5 to 15 kV, 1 k to 20 k times), and the thickness of the fiber membrane, the thickness of the metal layer, and the thickness of the solid insulating layer were determined from the obtained image.

Figure 11:
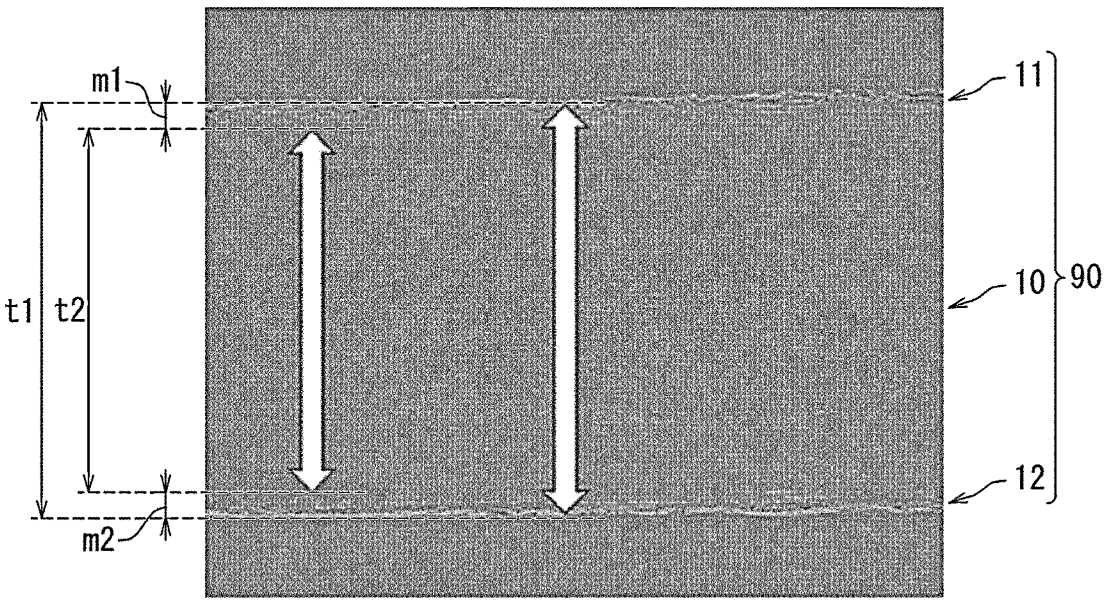
FIG. 11 is an electron microscope image showing a measurement example of the thicknesses of a fiber membrane, a metal layer, and a solid insulating layer.

FIG. 11 is a view illustrating a scanning electron microscope image of the fiber membrane 90 coated with metal. Here, as the thickness of the fiber membrane 90, the distance t1 between the front surface and the back surface of the metal-coated fiber membrane was measured. The penetration depths m1 and m2 of the metal into the fiber membrane were measured. The thickness t2 of the solid insulating layer 10 was calculated by subtracting the penetration depths m1 and m2 of the metal from the thickness t1 of the fiber membrane. The thicknesses t1, t2, m1, and m2 may be measured from a reflected electron image or an image obtained in element mapping analysis through energy dispersive X-ray spectroscopy.

Each sample may be subjected to pretreatment processing before section observation with a scanning electron microscope. In the example, as the pretreatment processing, each sample was solidified with a resin, and then the section of the sample was polished so that the fiber membrane was exposed. By such pretreatment processing, a sectional image including a portion coated with metal in the fiber membrane can be obtained. In the example, in the sectional image, the depth of the region where the contrast between the metal and the resin can be visually recognized is defined as the penetration depths m1 and m2.

The fiber membrane has a porous structure and has irregularities on the surface. Therefore, the thickness t1 of the fiber membrane and the thickness t2 of the solid insulating layer may vary depending on the measurement position. In the example, the maximum thickness of the fiber membrane in the sectional image was defined as the thickness t1, and the minimum thickness of the solid insulating layer in the sectional image was defined as the thickness t2.

4) Acoustic Characteristics (Sound Pressure Ratio)

For each sample, the acoustic characteristics of the pressure wave generating element were measured using a MEMS microphone (Knowles: SPU0410LR5H).

First, the pressure wave generating element for each sample was mounted on a circuit board such that the metal layer was located above the solid insulating layer (in a case where the metal layer was present on both surfaces of the solid insulating layer, one metal layer was placed on the upper side). Next, a microphone was disposed above the pressure wave generating element mounted on the circuit board. The distance between the pressure wave generating element and the microphone (distance in thickness direction of the solid insulating layer from the uppermost metal layer to the microphone in each sample) was set to 6 cm. Subsequently, a drive signal was input to the pressure wave generating element. In the example, the output voltage of the microphone was measured when the frequency of the drive signal was 60 KHZ. The input voltage to the pressure wave generating element was set to 6 to 18 V.

As the input power to the pressure wave generating element increases, the output of the microphone can increase linearly. As the pressure wave generating element has higher acoustic conversion efficiency, the slope of the output of the microphone with respect to the input power, that is, the ratio of the increment dV of the microphone output with respect to the increment dW of the input power increases. In the example, in order to evaluate the acoustic conversion efficiency of the pressure wave generating element, the slope dV/dw in each sample was obtained as an index of sound pressure, and the ratio (hereinafter, referred to as "sound pressure ratio") to dV/dW of comparative sample 1 (comparison target of the index) was calculated.

5) Element Resistance

The element resistance of each sample was measured by a four-terminal method using a digital multimeter (34410A from Agilent).

Evaluation Results

The evaluation results of the thickness t1 of the fiber membrane, the thickness t2 of the solid insulating layer (non-coated portion), the sound pressure ratio, and the element resistance for each sample are shown in Table 1.

TABLE 1

| | Thickness of fiber membrane (μm) | Thickness of non-coated portion of fiber membrane (μm) | Porosity of fiber membrane (%) | Metal layer | Sound pressure ratio [—] | Element resistance (Ω) |
|---|---|---|---|---|---|---|
| Sample 1 | 6.4 | 1.8 | 90.1 | Both surfaces of fiber membrane | 5.3 | 5.1 |
| Sample 2 | 15.2 | 10.5 | 90.1 | Both surfaces of fiber membrane | 7.0 | 4.7 |
| Sample 3 | 56.3 | 50.2 | 90.1 | Both surfaces of fiber membrane | 6.9 | 4.6 |
| Comparative sample 1 | — | — | — | One surface of PI film | 1.0 | 3.4 |
| Comparative sample 2 | 18.1 | 15.4 | 90.1 | Both surfaces of fiber membrane | 5.7 | 7.8 |

From the results shown in Table 1, it is confirmed that the fiber membrane having a metal-coated surface is formed (samples 1 to 3 and comparative sample 2) to significantly increase the sound pressure per unit input power (for example, sound pressure ratio: 5 or more) as compared with a single-layer element (comparative sample 1) having a metal layer on one surface of the PI film. This is presumably because, in samples 1 to 3 and comparative sample 2, the metal layer is formed by coating the fiber membrane with metal to increase the contact area between the metal layer and the air, and the non-coated portion of the PI fiber membrane can exhibit a higher heat insulating effect than the PI film and thereby allows the metal layer to efficiently heat the air.

In addition, it can be seen that by providing metal layers on both surfaces of the fiber membrane and connecting these metal layers in parallel (samples 1 to 3), the element resistance can be reduced while ensuring a high sound pressure ratio. In the samples 1 to 3, the total thickness of the two metal layers was larger than the thickness of the metal layer in comparative sample 2. Therefore, the element resistance is significantly reduced as compared to comparative sample 2.

The sound pressure ratio of the samples 1 to 3 is about the same as or higher than the sound pressure ratio of comparative sample 2. Presumably, in comparative sample 2, the air is heated to generate a pressure wave on one surface of the fiber membrane, but in samples 1 to 3, the air is heated to generate a pressure wave on both surfaces of the fiber membrane. In samples 1 to 3, the pressure wave generated on the lower surface side of the fiber membrane efficiently emits from above the element after passing through the fiber membrane. This is presumably because it is possible to suppress the decrease in the sound pressure ratio when the pressure wave on the lower surface side passes through the fiber membrane.

Comparing the sound pressure ratios of the samples 1 to 3 with each other, it is found that a thicker (for example, 10 μm or more) solid insulating layer (the non-coated portion of the fiber membrane) has a further improved sound pressure ratio. This is considered that a thicker solid insulating layer has a higher heat insulating effect. In addition, it can be seen that when the thickness of the solid insulating layer is, for example, 10 μm or more, a sufficient heat insulating effect can be obtained.

Furthermore, according to the structure of samples 1 to 3, the metal layers are provided on both surfaces of the fiber membrane. Therefore, it is possible to avoid a case where more metal layers are provided to increase the element size. Therefore, it is possible to downsize the pressure wave generating element capable of realizing high efficiency and high sound pressure.

Example 2

In Example 2, a laminated element having a structure in which a fiber membrane having only one surface coated with metal (second heating element M2) was stacked was prepared as sample 4 (see FIG. 9). In addition, as comparative sample 3, a single-layer element including only one fiber membrane having only one surface coated with metal was prepared.

Sample 4

The method for manufacturing the element of sample 4 will be described with reference to FIG. 9.

First, a PI fiber membrane was prepared by an electrospinning method as follows.

A PI solution prepared using N, N-dimethylformamide (DMF) as a solvent was used as a spinning solution. The solution was prepared so as to have a solution concentration of 5.5 wt %, and lithium chloride was added to the solution at 0.2 wt %. Then, using this solution (5.5 wt % PI solution), a PI fiber was spun onto an Al foil by an electrospinning method. As a collector on which the fiber membrane was deposited, a 200 mmφ drum collector was used, and spinning was performed while rotating at 100 rpm. In the electrospinning, the applied voltage was set to 30 kV, the distance between the nozzle and the collector was set to 13 cm, and the film formation time was adjusted so that the thickness of the fiber membrane was about 1 to 60 μm. The produced fiber had an average fiber diameter of 41 nm, a porosity of 87.3%, and a fiber membrane thickness of 17.2 μm.

Subsequently, the lower laminate LB was produced using the obtained fiber membrane.

First, the front surface of the fiber membrane was bonded to a PI film (support 53) having an opening having a size of 4 mm×4 mm. Here, an adhesive layer 63 was formed in advance on one surface of the PI film, and the fiber membrane and the PI film were thermocompression-bonded via the adhesive layer 63 to bond the fiber membrane to the PI film. Then, the Al foil was peeled off from the fiber membrane to transfer the fiber membrane to the support 53.

Next, a Si substrate (substrate 80) was bonded to the surface of the fiber membrane on the side opposite to the PI film (that is, the side from which the Al foil was peeled off). Here, a Si substrate having an adhesive layer 64 formed on one surface in advance was used, and the fiber membrane and the Si substrate were thermocompression-bonded via the adhesive layer 64 to bond the fiber membrane to the Si substrate.

Subsequently, as the metal layer 21, an Au film (size: 4 mm×4 mm) with a thickness distribution in a range of 1 to 40 nm was formed by a sputtering method in the region exposed by the opening of the support 53 in the front surface of the fiber membrane. In the fiber membrane, the portion located between the Au film and the Si substrate and not coated with Au (non-coated portion) was defined as "solid insulating layer 20". The thickness of the metal coating the surface of each fiber may have, for example, a distribution as described above with reference to FIG. 5.

Subsequently, a pair of connection electrodes 45 and 46 was formed at both ends of the metal layer 21 and both ends of the support 53 by a sputtering method. The structure of the connection electrodes 45 and 46 (thickness, material, size, distance between electrodes, etc.) were similar to the structure of the connection electrodes 41 and 42 in samples 1 to 3 in Example 1. In this way, the lower laminate LB including the substrate 80, the solid insulating layer 20, the metal layer 21, and the support 53 was obtained.

Next, the laminate L2 was produced using the fiber membrane.

First, the front surface of the fiber membrane was bonded to a PI film (support 51) having an opening having a size of 4 mm×4 mm, and the Al foil was peeled off from the fiber membrane to transfer the fiber membrane to the support 51. Here, a PI film having an adhesive layer 61 formed on one surface in advance was used, and the fiber membrane and the PI film were thermocompression-bonded via the adhesive layer 61 to bond the fiber membrane to the PI film. Next, a PET release film was bonded to the back surface of the fiber membrane (the surface from which the Al foil was peeled off). Here, an adhesive layer 65 having a PET release film formed on the surface thereof (adhesive layer with a PET release film) was disposed on the back surface of the fiber membrane, and the PET release film was thermocompression-bonded to the fiber membrane via the adhesive layer 65.

Subsequently, as the metal layer 11, an Au film (size: 4 mm×4 mm) with a thickness distribution in a range of 1 to 40 nm was formed by a sputtering method in the region exposed by the opening of the support 51 in the front surface of the fiber membrane. In the fiber membrane, the non-coated portion, which is not coated with Au, was defined as "solid insulating layer 10". The thickness of the metal coating the surface of each fiber may have, for example, a distribution as described above with reference to FIG. 5.

Subsequently, a pair of connection electrodes 41 and 42 was formed at both ends of the metal layer 21 and both ends of the support 51 by a sputtering method. The structure of the connection electrodes 41 and 42 (thickness, material, size, distance between electrodes, etc.) were similar to the structure of the connection electrodes 41 and 42 in samples 1 to 3 in Example 1. In this way, the laminate L2 including the solid insulating layer 10, the metal layer 21, and the support 51 was obtained.

The laminate L2 prepared by the above method was stacked on the lower laminate LB. Here, the PET release film was peeled off from the laminate L2, and then the laminate L2 and the lower laminate LB were thermocompression-bonded via the adhesive layer 65. The distance between the solid insulating layer 10 and the solid insulating layer 20 (distance between the fiber membranes in the Z direction) may be arbitrarily selected within a range of more than 0 μm and 2000 μm or less. The laminate L2 and the lower laminate LB were stacked, and then divided into pieces having a size of 6 mm×6 mm.

Subsequently, an Ag electrode paste was applied so as to be bonded to the connection electrodes 41, 42, 45, and 46, and dried and cured by heat treatment to form electrodes 31 and 32. Before the electrodes were formed, the support, the adhesive layer, the fiber membrane, and the like may be processed in advance by laser, punching, or the like to expose a part of the connection electrodes 45 and 46 of the lower laminate LB (a region to be connected to the electrodes). When the exposed portions of the connection electrodes 45 and 46 are bonded to the electrode material, good conduction can be secured between the metal layer 21 of the lower laminate LB and the electrodes 31 and 32. Through such a process, a pressure wave generating element for sample 4 was obtained.

Comparative Sample 3

As comparative sample 3, a single-layer element having the same structure as in sample 4 except that the laminate L2 was not included was produced. First, a laminate including a Si substrate, a solid insulating layer, a metal layer, a support, and a connection electrode was formed in the same manner as in the lower laminate LB in sample 4. Subsequently, a pair of electrodes was formed on the laminate in the same manner as in sample 4 to obtain a pressure wave generating element for comparative sample 3.

Evaluation Results

The element characteristics in sample 4 and comparative sample 3 were evaluated in the same manner as in Example 1. The results are shown in Table 2.

TABLE 2

| | Thickness of fiber membrane (μm) | Thickness of non-coated portion of fiber membrane (μm) | Porosity of fiber membrane (%) | Number of metal layer | Sound pressure ratio [—] | Element resistance (Ω) |
|---|---|---|---|---|---|---|
| Sample 4 | 17.2 | 15.6 | 87.3 | 2 | 5.4 | 3.3 |
| Comparative sample 3 | 17.2 | 15.6 | 87.3 | 1 | 6.1 | 6.9 |

From the results in Table 2, it can be seen that, when the fiber membranes having a metal layer on one surface (second heating elements) are stacked with each other and the metal layers are connected in parallel (sample 4), the element resistance can be reduced as compared with comparative sample 3, which is a single-layer element, while ensuring a high sound pressure ratio (for example, 5 or more). The reason why the decrease in the sound pressure ratio is suppressed is considered as follows: the metal layer located below heats the air to generate a pressure wave, and the pressure wave can be efficiently emitted from above the element through the fiber membrane.

Example 3

In Example 3, as samples 5 to 7, a laminated element having a structure in which a fiber membrane having both surfaces coated with metal (first heating element) was stacked above the lower laminate LB was prepared (See FIGS. 7 and 8).

Sample 5

The method for manufacturing the element for sample 5 will be described with reference to FIG. 7.

First, a fiber membrane (porosity: 90.1%) in which a fiber having an average fiber diameter of 41 nm and a fiber having an average fiber diameter of 176 nm were combined was prepared in the same manner as in Example 1.

Then, the fiber membrane was used to obtain the lower laminate LB. The structure and preparation method of the lower laminate LB were the same as those of the lower laminate LB for sample 4 in Example 2 except that the fiber membrane was used.

The laminate L1 was obtained using the fiber membrane. The structure and preparation method of the laminate L1 was the same as those of the laminate for samples 1 to 3 in Example 1 except that the fiber membrane was used. However, in the example, the thickness t1 of the fiber membrane was 18.1 μm, and the thickness t2 of the solid insulating layer (non-coated portion of the fiber membrane) 10 was 12.7 μm.

Subsequently, an adhesive layer 65 was introduced between the laminate L1 and the lower laminate LB and pressure-bonded to stack them. The distance between the fiber membrane including the solid insulating layer 10 and the fiber membrane including the solid insulating layer 20 (in this example, the thickness of the air layer 72) may be arbitrarily selected within the range of more than 0 μm and 2000 μm or less. The laminate L1 and the lower laminate LB were stacked, and then divided into pieces having a size of 6 mm×6 mm.

Subsequently, an Ag electrode paste was applied so as to be bonded to each of the connection electrodes 41 to 46, and dried and cured by heat treatment to form electrodes 31 and 32. Before the electrodes were formed, the support, the adhesive layer, the fiber membrane, and the like may be processed in advance by laser, punching, or the like so that the connection electrodes 41 to 46 of the lower laminate LB and the laminate L1 are exposed. When the exposed parts of the connection electrodes 41 and 46 are bonded to the electrode material, good conduction can be secured between the metal layers 11, 12, and 21 of the lower laminate LB and the laminate L1 and the electrodes 31 and 32. Through such a process, a pressure wave generating element for sample 5 was obtained.

Sample 6

A pressure wave generating element for sample 6 was produced in the same manner as in sample 5 except that two laminates L1 were stacked above the lower laminate LB (see FIG. 8). The two laminates L1 were bonded by thermocompression bonding with an adhesive layer interposed therebetween. The interval between the fiber membranes in the two laminates L1 can be arbitrarily selected in the range of more than 0 μm and 2000 μm or less.

Sample 7

A pressure wave generating element for sample 7 was produced in the same manner as in samples 5 and 6 except that three laminates L1 were stacked above the lower laminate LB.

Evaluation Results

The element characteristics in samples 5 to 7 were evaluated in the same manner as in Example 1. The results are shown in Table 3. For comparison, the results in comparative sample 2 in Example 1 are also shown in Table 3. Comparative sample 2 is a single-layer element produced using the same fiber membrane as in the example.

TABLE 3

| | Porosity of fiber membrane | Number of fiber membrane | Number of metal layer | Sound pressure ratio [−] | Element resistance [Ω] |
|---|---|---|---|---|---|
| Sample 5 | 90.1 | 2 | 3 | 6.1 | 4.0 |
| Sample 6 | 90.1 | 3 | 5 | 4.6 | 2.7 |
| Sample 7 | 90.1 | 4 | 7 | 4.1 | 2.1 |
| Comparative sample 2 | 90.1 | 1 | 1 | 5.7 | 7.8 |

From the results in Table 3, it can be seen that, when the fiber membranes having metal layers formed on both surface are stacked with each other and the metal layers are connected in parallel (samples 5 to 7), the element resistance can be reduced as compared with comparative sample 2, which is a single-layer element, while ensuring a high sound pressure ratio (for example, 4 or more). The reason why the decrease in the sound pressure ratio is suppressed is considered as follows: the metal layer located below heats the air to generate a pressure wave, and the pressure wave can be efficiently emitted from above the element through the fiber membrane, as described in Example 2.

Furthermore, from the comparison of the element characteristics in samples 5 to 7, it can be seen that the element resistance can be further reduced when more metal layers are provided. When more fiber membranes on which a metal layer is formed are provided, a pressure wave generated by energization of the metal layer located below needs to pass through more fiber membranes, so that the pressure wave is less likely to be emitted from above the element. Therefore, when more metal layers are provided, the sound pressure ratio tends to decrease (the sound pressure decreases with respect to the unit input power). In such a case, since the element resistance can be greatly reduced, a sufficient sound pressure can be generated by an increase in input power.

Example 4

In Example 4, a laminated element having a structure in which a PI film having a metal layer formed on one surface thereof (second heating element) was stacked was prepared as sample 8. In addition, a laminated element having a structure in which a PI film having metal layers formed on both surfaces thereof (first heating element) was stacked was prepared as sample 9.

Sample 8

A PI film (thickness: 25 μm, size: 6 mm×6 mm) was prepared as a solid insulating layer. An Au film (thickness: 20 nm, size: 4 mm×4 mm) was formed as a metal layer on only one surface of the PI film by a sputtering method. Subsequently, a pair of connection electrodes was formed on both ends of the metal layer by a sputtering method. In this way, a laminate including a PI film on which an Au film was formed was obtained. The laminate was produced twice, and the two laminates were stacked with an adhesive layer interposed therebetween with the surface on which the metal layer (Au film) was formed facing upward. Thereafter, a pair of electrodes was formed so as to be bonded to the connection electrode of each metal layer. The structure (thickness, material, size, distance between electrodes, etc.) and the production method of the connection electrode and the electrode were similar to those in samples 1 to 3 described above. Through such a process, a pressure wave generating element for sample 8 was obtained.

Sample 9

A PI film (thickness: 25 μm, size: 6 mm×6 mm) was prepared as a solid insulating layer. An Au film (thickness: 20 nm, size: 4 mm×4 mm) was formed as a metal layer on each of the front surface and the back surface of the PI film by a sputtering method. Subsequently, a pair of connection electrodes was formed on both ends of the metal layer by a sputtering method, respectively. Thereafter, a pair of electrodes was formed so as to be bonded to the connection electrode of each metal layer. The structure (thickness, material, size, distance between electrodes, etc.) and the production method of the connection electrode and the electrode were similar to those in samples 1 to 3 described above. Through such a process, an element for sample 9 was obtained.

Evaluation Results

The element characteristics in samples 8 and 9 were evaluated in the same manner as in Example 1. The results are shown in Table 4. For comparison, the results in comparative sample 1 in Example 1 are also shown in Table 4. Comparative sample 1 is a single-layer element using a PI film as a solid insulating layer.

TABLE 4

| | Number of PI film (solid insulating layer) | Number of metal layer | Sound pressure ratio [−] | Element resistance [Ω] |
|---|---|---|---|---|
| Sample 8 | 2 | 2 | 0.7 | 1.3 |
| Sample 9 | 1 | 2 | 0.7 | 1.3 |
| Comparative sample 1 | 1 | 1 | 1.0 | 3.4 |

From the results in Table 4, it is found that, when metal layers are provided on both surface of the PI film and the metal layers are connected in parallel (samples 8 and 9), the element resistance can be reduced as compared with comparative sample 1, which is a single-layer element. In Samples 8 and 9, the sound pressure ratio is slightly lower than that of comparative sample 1, but the element resistance is significantly reduced. Therefore, a high sound pressure can be generated by increasing the input power.

Note that by appropriately combining any of the various embodiments described above, the effects included in each embodiment can be achieved.

Although the present description has been fully described in connection with preferred embodiments with reference to the accompanying drawings, various modifications and corrections are apparent to those skilled in the art. Such modifications and corrections should be understood to be included within the scope of the present description according to the appended claims as long as they do not depart therefrom.

The description of the pressure wave generating element according to the present description can also be expressed as follows.

The pressure wave generating element of the first aspect is a thermal excitation type pressure wave generating element, including: a first solid insulating layer having a first principal surface; a first metal layer on the first principal surface of the first solid insulating layer; a second metal layer disposed at a distance from the first metal layer in a thickness direction of the first solid insulating layer such that the first solid insulating layer is located between the first metal layer and the second metal layer; a first electrode electrically connected to a first end side of the first metal layer and a second end side of the second metal layer; and a second electrode electrically connected to a third end side of the first metal layer and a fourth end side of the second metal layer.

The pressure wave generating element of the second aspect is: in the pressure wave generating element of the first aspect, the first solid insulating layer has a second principal surface opposed to the first principal surface, and the second metal layer is on the second principal surface of the first solid insulating layer.

The pressure wave generating element of the third aspect is: in the pressure wave generating element of the second aspect, each of the first metal layer and the second metal layer is a fiber-containing metal layer on a front surface and a back surface, respectively, of a fiber membrane having a porous structure, and the first solid insulating layer includes a portion located between the first metal layer and the second metal layer in the fiber membrane.

The pressure wave generating element of the fourth aspect is: in the pressure wave generating element of the third aspect, the first solid insulating layer has a thickness of 10 μm or more.

The pressure wave generating element of the fifth aspect is: in the pressure wave generating element of the second to fourth aspects, further including a third metal layer disposed on a side of the second metal layer opposite to the first solid insulating layer in the thickness direction and at a distance from the second metal layer, wherein the first electrode is electrically connected to a fifth end side of the third metal layer, and the second electrode is electrically connected to a sixth end side of the third metal layer.

The pressure wave generating element of the sixth aspect is: in the pressure wave generating element of the first aspect, further including a second solid insulating layer having a third principal surface, wherein the second metal layer is on the third principal surface of the second solid insulating layer, and the second metal layer is disposed between the first solid insulating layer and the second solid insulating layer at a distance from the first solid insulating layer.

The pressure wave generating element of the seventh aspect is: in the pressure wave generating element according to any one of the first to sixth aspect, the first solid insulating layer has a porous structure having a plurality of through-holes.

The pressure wave generating element of the eighth aspect is: in the pressure wave generating element of the seventh aspect, the first solid insulating layer contains a fiber, and the first solid insulating layer has a porosity of 80% to 95%.

The pressure wave generating element of the ninth aspect is: in the pressure wave generating element according to any one of the first to eighth aspects, further including an annular support structure that supports an outer periphery of the first metal layer.

The pressure wave generating element of the tenth aspect is: in the pressure wave generating element of the ninth aspect, the annular support structure supports an outer periphery of the first metal layer and the second metal layer.

The pressure wave generating element of the eleventh aspect is: in the pressure wave generating element of the sixth aspect, the first metal layer and the second metal layer form a unit heating element, and the pressure wave generating element comprises a plurality of unit heating elements, wherein the plurality of unit heating elements are stacked at a distance from each other along the thickness direction from a side of the second metal layer, and the first end side of the first metal layer is electrically connected to the first electrode in each of the plurality of unit heating elements, and the second end side of the first metal layer is electrically connected to the second electrode in each of the plurality of unit heating elements.

The pressure wave generating element of the twelfth aspect is: in the pressure wave generating element according to any one of the second to fifth aspects, the first solid insulating layer, the first metal layer, and the second metal layer form a unit heating element, and the pressure wave generating element comprises a plurality of unit heating elements, wherein the plurality of unit heating elements are stacked at a distance from each other along the thickness direction, and the first end side of the first metal layer and the second end side of the second metal layer are electrically connected to the first electrode in each of the plurality of unit heating elements, and the third end side of the first metal layer and the fourth end side of the second metal layer are electrically connected to the second electrode in each of the plurality of unit heating elements.

The pressure wave generating element according to the present description is industrially useful because it can generate a higher sound pressure.

DESCRIPTION OF REFERENCE SYMBOLS

10, 20: Solid insulating layer
10*a*, 10*b*, 20*a*, 20*b*: Principal surface of solid insulating layer
11, 12, 21: Metal layer
11*a*, 21*a*: Upper surface of metal layer
11*b* Lower surface of metal layer
31, 32: Electrode
41 to 46: Connection electrode
50: Support structure
51 to 53: Support
61 to 66: Adhesive layer
71, 72: Air layer
80: Substrate
90: Fiber membrane
101 to 104: Pressure wave generating element

The invention claimed is:

1. A pressure wave generating element, comprising:

a first solid insulating layer having a first principal surface and a second principal surface opposed to the first principal surface;

a first metal layer on the first principal surface of the first solid insulating layer;

a second metal layer on the second principal surface of the first solid insulating layer and disposed at a distance from the first metal layer in a thickness direction of the first solid insulating layer such that the first solid insulating layer is located between the first metal layer and the second metal layer;

a first electrode electrically connected to a first end side of the first metal layer and a second side of the second metal layer; and a second electrode electrically connected to a third end side of the first metal layer and a fourth end side of the second metal layer, wherein;

each of the first metal layer and the second metal layer is a fiber-containing metal layer on a front surface and a back surface, respectively, of a fiber membrane having a porous structure, and the first solid insulating layer includes a portion located between the first metal layer and the second metal layer in the fiber membrane.

2. The pressure wave generating element according to claim 1, wherein the first solid insulating layer has a thickness of 10 μm or more.

3. A pressure wave generating element comprising:

a first solid insulating layer having a first principal surface and a second principal surface opposed to the first principal surface;

a first metal layer on the first principal surface of the first solid insulating layer;

a second metal layer on the second principal surface of the first solid insulating layer and disposed at a distance from the first metal layer in a thickness direction of the first solid insulating layer such that the first solid insulating layer is located between the first metal layer and the second metal layer;

a third metal layer disposed on a side of the second metal layer opposite to the first solid insulating layer in the thickness direction and at a distance from the second metal layer;

a first electrode electrically connected to a first end side of the first metal layer and a second side of the second metal layer; and a second electrode electrically connected to a third end side of the first metal layer and a fourth end side of the second metal layer, wherein the first electrode is electrically connected to a fifth end side of the third metal layer, and the second electrode is electrically connected to a sixth end side of the third metal layer.

4. The pressure wave generating element according to claim 3, further comprising a second solid insulating layer having a third principal surface, wherein the third metal layer is on the third principal surface of the second solid insulating layer, and the third metal layer is disposed between the first solid insulating layer and the second solid insulating layer at a distance from the first solid insulating layer.

5. The pressure wave generating element according to claim 1, wherein the first solid insulating layer has a porous structure having a plurality of through-holes.

6. The pressure wave generating element according to claim 5, wherein the first solid insulating layer contains a fiber, and the first solid insulating layer has a porosity of 80% to 95%.

7. The pressure wave generating element according to claim 1, wherein the first solid insulating layer contains a fiber.

8. The pressure wave generating element according to claim 1, wherein the first solid insulating layer has a porosity of 80% to 95%.

9. The pressure wave generating element according to claim 1, further comprising an annular support structure that supports an outer periphery of the first metal layer.

10. The pressure wave generating element according to claim 9, wherein the annular support structure supports an outer periphery of the first metal layer and the second metal layer.

11. A pressure wave generating element comprising:

a first solid insulating layer having a first principal surface;

a first metal layer on the first principal surface of the first solid insulating layer;

a second metal layer disposed at a distance from the first metal layer in a thickness direction of the first solid insulating layer such that the first solid insulating layer is located between the first metal layer and the second metal layer;

a first electrode electrically connected to a first end side of the first metal layer and a second side of the second metal layer;

a second electrode electrically connected to a third end side of the first metal layer and a fourth end side of the second metal layer; and a second solid insulating layer having a third principal surface, wherein the second metal layer is on the third principal surface of the second solid insulating layer, and the second metal layer is disposed between the first solid insulating layer and the second solid insulating layer at a distance from the first solid insulating layer, wherein the first metal layer and the second metal layer form a unit heating element, and the pressure wave generating element comprises a plurality of the unit heating elements, wherein the plurality of unit heating elements are stacked at a distance from each other along the thickness direction from a side of the second metal layer, and wherein the first end side of the first metal layer is electrically connected to the first electrode in each of the plurality of unit heating elements, and the second end side of the first metal layer is electrically connected to the second electrode in each of the plurality of unit heating elements.

12. A pressure wave generating element, comprising:

a first solid insulating layer having a first principal surface and a second principal surface opposed to the first principal surface;

a first metal layer on the first principal surface of the first solid insulating layer;

a second metal layer on the second principal surface of the first solid insulating layer and disposed at a distance from the first metal layer in a thickness direction of the first solid insulating layer such that the first solid insulating layer is located between the first metal layer and the second metal layer;

a first electrode electrically connected to a first end side of the first metal layer and a second side of the second metal layer; and a second electrode electrically connected to a third end side of the first metal layer and a fourth end side of the second metal layer, wherein the first solid insulating layer, the first metal layer, and the second metal layer form a unit heating element, and the pressure wave generating element comprises a plurality of the unit heating elements, wherein the plurality of unit heating elements are stacked at a distance from each other along the thickness direction, and wherein the first end side of the first metal layer and the second end side of the second metal layer are electrically connected to the first electrode in each of the plurality of unit heating elements, and the third end side of the first metal layer and the fourth end side of the second metal layer are electrically connected to the second electrode in each of the plurality of unit heating elements.

13. A pressure wave generating element comprising:

a first solid insulating layer having a first principal surface;

a first metal layer on the first principal surface of the first solid insulating layer;

a second metal layer disposed at a distance from the first metal layer in a thickness direction of the first solid insulating layer such that the first solid insulating layer is located between the first metal layer and the second metal layer;

a first electrode electrically connected to a first end side of the first metal layer and a second side of the second metal layer;

a second electrode electrically connected to a third end side of the first metal layer and a fourth end side of the second metal layer;

a first connection electrode that electrically connects the first metal layer to the first electrode;

a second connection electrode that electrically connects the first metal layer to the second electrode;

a third connection electrode that electrically connects the second metal layer to the first electrode; and a fourth connection electrode that electrically connects the second metal layer to the second electrode.

14. The pressure wave generating element according to claim 13, wherein the first and second connection electrodes have a comb-like structure arranged to face each other in a plan view of the pressure wave generating element.

15. The pressure wave generating element according to claim 14, wherein the third and fourth connection electrodes have a comb-like structure arranged to face each other in a plan view of the pressure wave generating element.

* * * * *